Dec. 13, 1966  A. J. CAMPANELLA  3,291,989
ALL-WEATHER ANGULAR TRACKING SYSTEM
Filed April 8, 1963  2 Sheets-Sheet 1
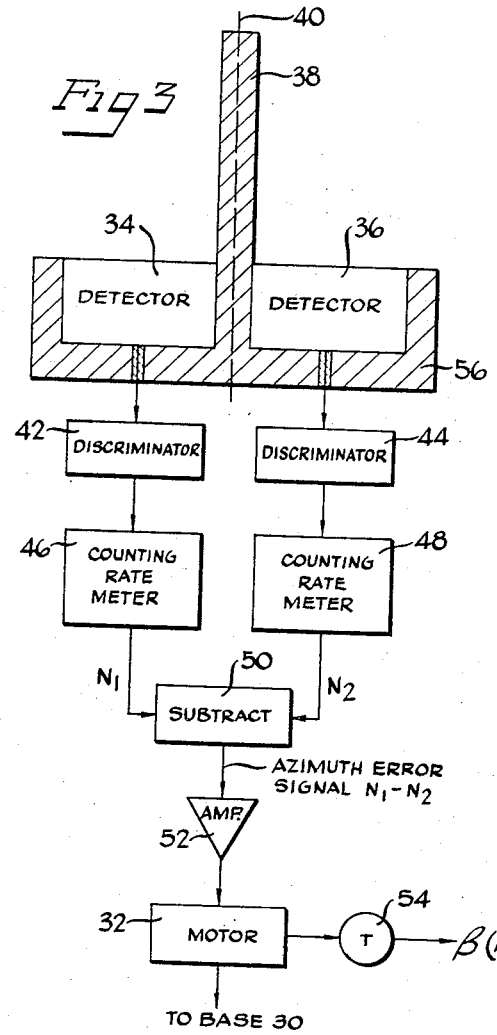
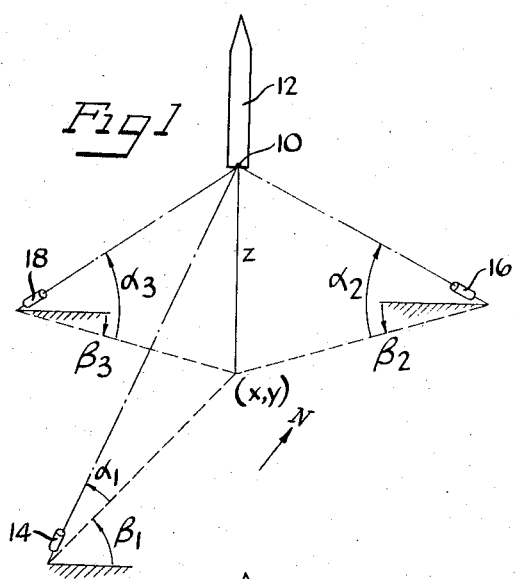
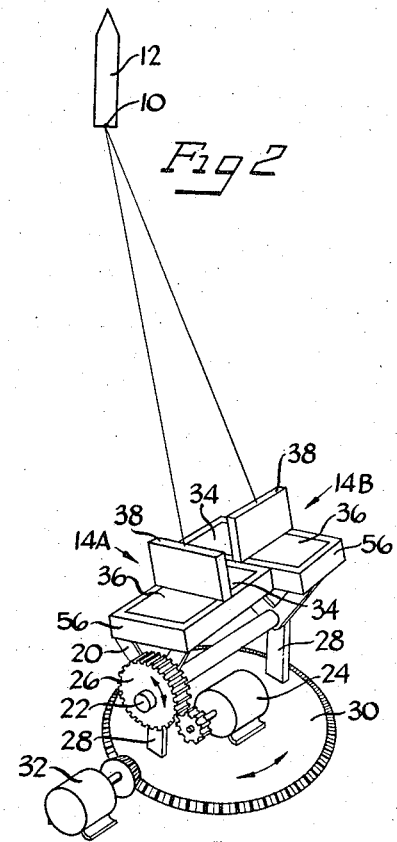
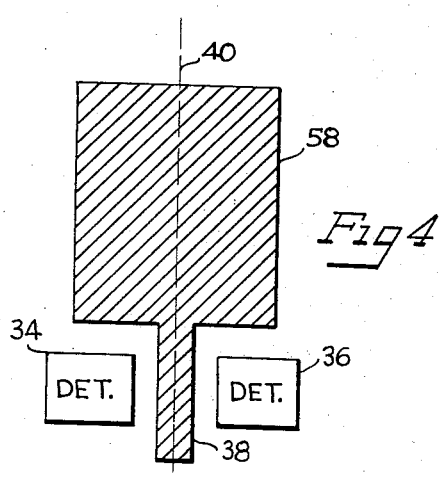
INVENTOR.
Angelo J. Campanella
BY Charles M. Hutchins
ATTORNEY Dec. 13, 1966  A. J. CAMPANELLA  3,291,989
ALL-WEATHER ANGULAR TRACKING SYSTEM
Filed April 8, 1963  2 Sheets-Sheet 2
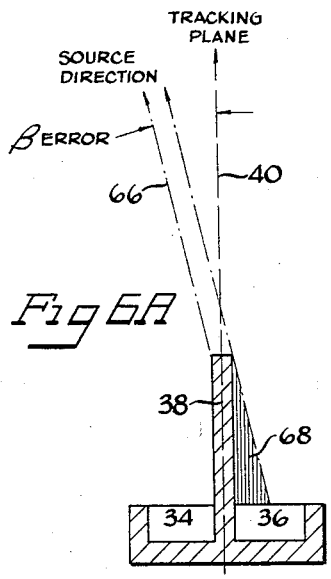
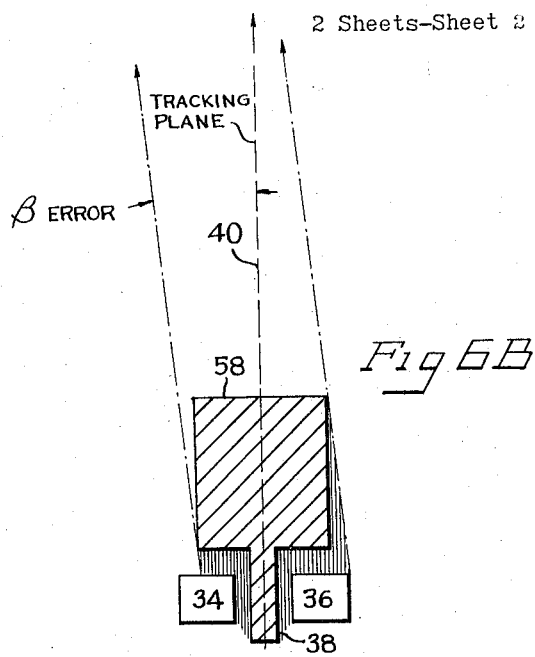
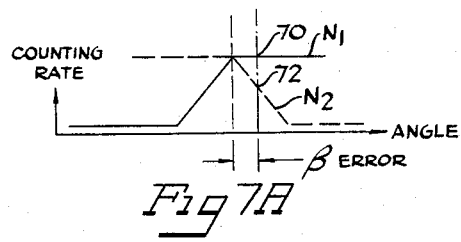
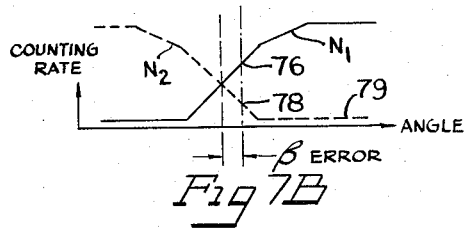
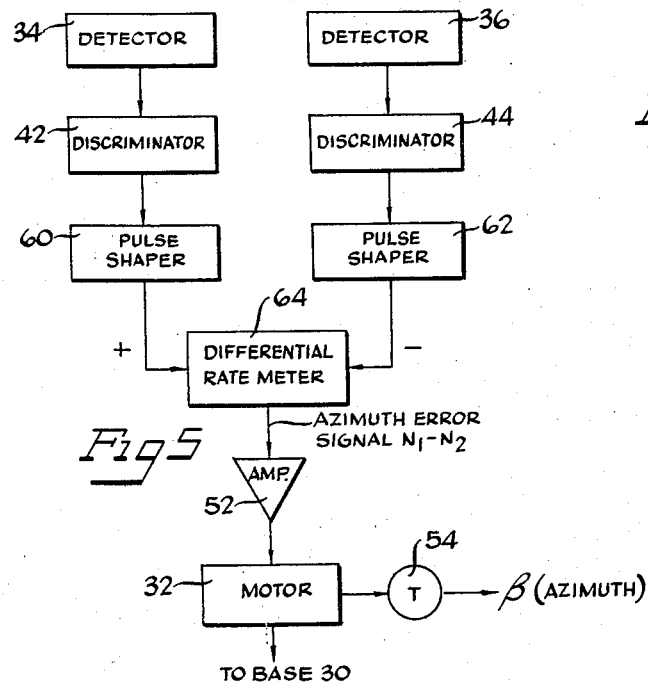
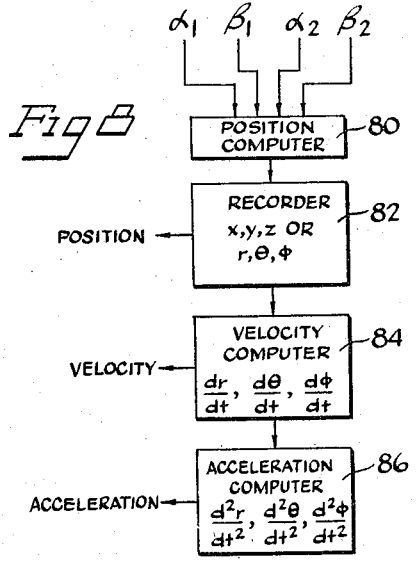
INVENTOR.
Angelo J. Campanella
BY Charles M. Hutchins
ATTORNEY United States Patent Office 3,291,989
Patented Dec. 13, 1966

3,291,989
ALL-WEATHER ANGULAR TRACKING SYSTEM
Angelo J. Campanella, Columbus, Ohio, assignor to Industrial Nucleonics Corporation, a corporation of Ohio
Filed Apr. 8, 1963, Ser. No. 271,342
9 Claims. (Cl. 250—83.3)

This invention relates to a method and a system for fixing the position of an object located at some distance from a detection station. More particularly, it relates to a nuclear angular tracking system whereby the position of a missile is determined by measuring at a plurality of ground stations the direction of radiations emitted from a radioactive source affixed to the missile.

For various aerospace applications, it is necessary to track accurately or fix the position of a moving body such as a missile, which may be a rocket. In the past, this tracking has been achieved by radar, by Doppler ranging and by optical and infrared measurements. Radar and Doppler ranging are not accurate for short ranges or low velocity. In many operations, it is necessary that the missile be accurately tracked during the early part of its trajectory, particularly in the first thousand feet. Optical and infrared measurements are useful at short range and at low velocities; however, they require fair weather.

It has been suggested that a missile be located by measuring, at a plurality of ground stations, the intensity of penetrative radiations produced by radioactive material carried by the missile and computing the position of the missile from these measurements by triangulation. Such systems have required strong sources or very large detectors to achieve adequate accuracy. It has also been suggested that the direction from which the penetrating radiations are coming be determined as an indication of the direction of the missile and to combine multiple measurements to derive separate indications of three coordinates identifying the instantaneous position of the missile in space relative to a reference datum. This has the advantage that, except for statistical fluctuations, the measurements are independent of source strength. Thus it is not necessary to determine source strength and change instrument calibration when the system is used with different missiles and sources. Further, the computer used can be the same as those previously used in optical tracking.

The angular tracking system previously suggested involved the rotation of a heavy metal collimator and the determination of the direction of its axis of rotation when the detected radiation remained uniform as the collimator rotated. In the preferred form of the present invention a pair of radiation detectors are separated by a radiation shield that extends a substantial distance from the detectors and restricts the sensitivity of the respective detectors to different directions. The shield is moved toward the direction where the counting rates of the two detectors are equal. This direction is indicative of the relative position of the source.

It is, therefore, the primary object of the present invention to provide a tracking system which has capability for accurately tracking an object such as a missile during the initial parts of its trajectory. It is a further object of the invention to track or locate an object under all weather conditions particularly under weather conditions that would render optical tracking devices relatively useless. It is still another object to provide a system for tracking or fixing the position of a source of penetrating radiation, which system is substantially independent of source strength. It is still another object to provide a nuclear angular tracking system for tracking or fixing the position of a body carrying a source of penetrating radiation in which the tracking units determine the angular disposition of the body from each unit. It is a still further object to provide such a system which does not require rotation of a massive collimator. It is also an object to provide such a system in which the source is tracked using a pair of radiation detectors symmetrically arranged with a radiation shield therebetween. Another object is to provide such a system in which the counting rates of the respective detectors are compared to provide a control signal for directing the shield and detectors to make the counting rates equal. Still another object is to provide such a system in which discrimination means is used to eliminate much of the background and scattered radiation and thereby emphasize the radiation coming directly from the source. Other objects and advantages will be apparent from consideration of the following description taken in connection with the drawings in which:

FIGURE 1 is a diagrammatic illustration of one form of the nuclear angular tracking system of the present invention, showing its geometry;

FIGURE 2 is a perspective view showing in greater detail one form of a tracking unit useful in the system shown in FIGURE 1;

FIGURE 3 is an illustration, partly in section and partly diagrammatic, showing one form of detection unit and servo system useful in the tracking unit shown in FIGURE 2;

FIGURE 4 is an illustration, partly in section and partly diagrammatic, showing another form of radiation shield useful in the detection unit shown in FIGURE 3;

FIGURE 5 is a block diagram of an alternative servo system and angle indicating circuit useful with the radiation shields shown in FIGURES 3 and 4;

FIGURES 6A and 6B show example embodiments of detector units for illustrating the operation of the present invention;

FIGURES 7A and 7B show the response curves of the detector unit under the conditions shown in FIGURES 6A and 6B, respectively; and FIGURE 8 is a block diagram of a computer that may be used in the system shown in FIGURE 1.

The present invention relates to a position indicating system and method, in particular for tracking a moving missile. The missile carries radioactive material emitting penetrating radiation. "Penetrating radiation," as used herein, refers to radiation penetrative of clouds and fog that is not capable of being readily focused like light and infrared. The penetrating radiations preferred for use in this invention are gamma rays and bremsstrahlung. A fixed detection system, preferably on the ground, simultaneously measures at least three separate planes in each of which lies the radioactive material. The system produces respective signals each indicative of one of these planes. A computer takes these signals and from them computes the instantaneous position of the missile. The computer provides an indication of this position which may be visual and is preferably provided as the three coordinates of a three dimensional coordinate system having a predetermined reference datum. The computer may also compute and indicate the instantaneous velocity or acceleration of the missile.

Although it is necessary to have but three separate planes to define a point in space, it is convenient to measure both azimuth and elevation at respective tracking stations and it is, therefore, convenient to have two measurements of azimuth and two measurements of elevation. This provides additional information that increases the accuracy of measurement. Accuracy can be still further increased by adding additional tracking stations.

Referring now to FIGURE 1, there is shown a tracking arrangement wherein a radioactive source 10 that produces penetrating radiation is attached to a moving vehicle such as a missile 12. Three tracking units 14, 16, 18 located at respective tracking stations are illustrated. The function of each tracking unit is to obtain an elevation angle α and an azimuth angle β relating the angular position of the source to arbitrary elevation and azimuth reference lines. Each tracking unit points toward the source, as will be explained below. The pointing position at each tracking station yields the elevation and azimuth angles. The reference for the azimuth angle illustrated in FIGURE 1 is an east-west line. The reference for the elevation angle is preferably a plane connecting the three tracking stations, which plane is preferably horizontal. Such reference planes and base lines are determined by appropriate surveying means prior to the actual tracking of a missile. Precise angular information from two stations will fix the position of the source and hence the missile. However, additional accuracy may be obtained by adding redundant information from additional tracking stations, three stations being shown in FIGURE 1. The tracking stations are preferably spaced apart so that the angles between the tracking planes are in the vicinity of 90° over a large portion of the trajectory being measured. Preferably they are spaced about 90° apart about the launching pad of the missile, and when but two stations are used, one is preferably aligned north and south with the launching pad and the other aligned east and west. This simplifies the computer requirements. It is also preferable that each station be spaced from the launching pad by a distance of the order of the height of the part of the trajectory being measured.

FIGURE 2 illustrates a preferred form of the tracking unit 14. The other tracking units may be the same. In its preferred form the tracking unit comprises two units 14A and 14B rigidly fastened together to move as a single unit. Tracking units 14A and 14B are preferably identical except that they are disposed at right angles to each other. In the preferred form of the invention as illustrated, the tracking unit 14A is used to determine the azimuth of the source 10 relative to the tracking unit and tracking unit 14B is used to determine the elevation of the source 10 relative to the tracking unit. Tracking units 14A and 14B are preferably rigidly mounted on a mounting bracket 20. The bracket is mounted for rotation on a shaft 22 about a horizontal axis. It is rotated by the action of a motor 24 which drives a gear 26 to turn the bracket about the horizontal axis. As shown, the shaft 22 is mounted in bearing members 28 which are affixed to a base 30 rotatably mounted on the ground or some other fixed platform. The base is rotated about a vertical axis by the action of a motor 32. As will later be described in greater detail, the motor 32 is controlled by the tracking unit 14A to rotate the tracking unit 14B to direct it at the source 10. Similarly, the motor 24 is controlled by the tracking unit 14B to drive the gear 26 to turn the tracking unit 14B so that it is directed at the source 10. Under these conditions, the direction in which tracking unit 14A is pointing indicates the azimuth of the source 10 relative to the tracking unit, and the direction in which 14B is pointing indicates the elevation of the source 10 relative to the tracking unit.

In a preferred form of the tracking units, as shown in FIGURE 2, each tracking unit comprises a pair of radiation detectors 34 and 36 and a radiation shield 38. The detectors 34 and 36 are disposed symmetrically on opposite sides of the shield 38 which limits the directions whence penetrating radiation may reach the detectors 34 and 36 and be detected.

A preferred form of tracking unit 14A is shown in FIGURE 3. As shown, the radiation shield 38 is a flat slab of heavy metal sufficient to stop a substantial portion of any penetrating radiation striking it. The respective radiation detectors 34 and 36 are symmetrically arranged on either side of the shield 38 which then serves to shield each detector from radiations arriving at the tracking unit from the other side of the shield. The shield 38 serves to define a tracking plane 40 through its center.

Depending upon the radiation field, more penetrating radiation will reach the tracking unit from certain directions than from others. In particular, radiation will be most intense from the direction of the source 10. Thus more radiation will reach the tracking unit from one side or the other of the tracking plane 40, depending upon the relative direction of the source 10, except that the radiations reaching it from both sides will be equal when the source 10 lies in the tracking plane 40.

The detectors 34 and 36 are preferably scintillation counters each comprising a phosphor and a photomultiplier. Each includes an appropriate power supply. The output of such a detector is a series of pulses, each pulse corresponding to a detected radiation. The size of each pulse is related to the amount of energy the detected radiation lost in the phosphor, the larger energies producing larger pulses. The output pulses may include a number of small "dark current" pulses spontaneously produced by the photomultiplier. The output of each detector is applied to a respective discriminator 42, 44. Each discriminator serves in a conventional manner to eliminate the low amplitude pulses. It may also serve to convert the remaining pulses to pulses of uniform size and shape.

The output pulses from the discriminators 42, 44 are applied to respective counting rate meters 46 and 48. These counting rate meters may be conventional integration circuits which derive D.C. signals each indicative of the rate at which pulses are applied thereto, i.e., the number of pulses per unit time. The rate at which pulses are connected by counting rate meter 46 and the signal indicative thereof may be denoted $N_1$, and the rate at which pulses are counted by the counting rate meter 48 and the signal indicative thereof may be denoted $N_2$.

The output signals from the counting rate meters 46 and 48 are applied to a circuit 50 which compares the two signals, preferably by determining their difference, to derive an output signal which may be amplified by a power amplifier 52 and applied to one of the tracking unit motors. As shown in the drawing, the signal is applied to the motor 32 which drives the base 30. The tracking unit shown in FIGURE 3 is thus the azimuth tracking unit 14A; however, the elevational tracking unit 14B would be substantially identical thereto. The signal from the subtractor circuit 50 is thus equal to $N_1-N_2$ and is the azimuth error signal. The output from subtractor circuit 50 depends upon a difference in radiation reaching the respective detectors, which can exist only when the radiations reaching the tracking unit from opposite sides of the tracking plane 40 are unequal. This is true whenever the source 10 is not on the tracking plane 40. When the source 10 is displaced from this tracking plane, more radiation reaches the particular detector on the side of the tracking plane on which the source lies, and the pulses in the respective channel are counted faster. Thus the output of the corresponding counting rate meter is greater. Under such circumstances, there is an azimuth error signal indicating that the azimuth tracking unit 14A is not directed at the source.

This azimuth error signal is applied to the motor 32 which drives the base 30 to reduce this error by moving the tracking unit so that the source 10 lies in the tracking plane 40. At the same time, the motor turns an azimuth angle transmitter 54 which derives a signal corresponding to the azimuth position of the base 30 and hence the direction in which the tracking unit 14A is directed. This signal is indicative of an angle β, the azimuth of the source 10 with respect to the tracking unit 14.

The tracking unit 14B operates in substantially the same manner to direct the tracking unit 14B so that its median plane is directed toward the source 10. Similarly, this unit provides a signal indicative of the angle α, the elevation of the source 10 with respect to the tracking unit 14.

To eliminate much of the background radiation, the detectors are preferably shielded on the back and sides by an additional radiation shield 56.

In FIGURE 4 is shown an alternative form of the radiation shield 38. Instead of being merely a flat slab, the shield is a rectangular solid 58 with a projecting divider 38 between the detectors. This in no way changes the principle of operation of the system; however, it does change the response curves of the two detectors, i.e., counting rate as a function of the direction of the source. This will be understood better by reference to FIGURES 6A, 6B, 7A, and 7B, as described below.

In FIGURE 5 is shown an alternative servo system. Although as noted before, the discriminators may include appropriate pulse shaping circuits, in the form of the invention shown in FIGURE 5, the outputs of the discriminators 42 and 44 are applied to respective separate pulse shapers 60 and 62. These pulse shapers convert the pulses applied thereto into corresponding pulses, all of the same size and shape. However, one of the pulse shapers puts out pulses of opposite polarity from those put out by the other. These pulses are then combined in a differential rate meter 64 which derives a signal directly indicative of the difference in rates at which pulses of the respective polarities are applied thereto. This derives the signal $N_1 - N_2$ which may then be amplified by the amplifier 52 and used to drive the motor 32 in the manner described above in connection with FIGURE 3. The motor 32 then drives the base 30 in such direction as to reduce the signal from the rate meter 64, thus moving the tracking plane 40 so that the source 10 lies more nearly in it.

The operation of the tracking unit can be better understood by reference to FIGURES 6A and 6B and 7A and 7B. FIGURE 6A illustrates the operation of the apparatus of FIGURE 3, while FIGURE 6B illustrates the operation of the apparatus of FIGURE 4, which is comparable. For the purposes of illustration, the radioactive material or source 10 lies in the direction 66 as indicated by the arrows. The angle between the direction of the source and the tracking plane 40 is the angle $\beta_{ERROR}$, the angle by which the tracking unit has not been turned to the balanced position where both detectors 34 and 36 are equally irradiated by the source.

Referring first to FIGURE 6A, inasmuch as the source does not lie in the tracking plane, that is, it does not lie in the direction of the shield 38, the shield intercepts some of the radiation coming in a straight line from the source 10 to the detector 36. As indicated in FIGURE 6A, this is like casting a shadow 68, and for this reason the shield has been called a shadow vane and the tracking unit a shadow-vane detector or a shadow-edge detector.

A somewhat idealized set of response curves is shown in FIGURE 7A, in which $N_1$ is the response curve for detector 34, and $N_2$ is the response curve for detector 36. The curves show counts or counting rate as a function of the angle of the tracking unit of FIGURE 6A. The curves show the counting rates as the source is disposed at different angles with respect to the tracking unit. The curves have maximum counting rates where the source lies in a direction on the same side of the tracking plane as the respective detector. When the source lies on the tracking plane both curves are equal and maximum. When the source is displaced from the tracking plane, the shield 38 casts a shadow on one or the other of the detectors, and the counting rate is less for the detector upon which the shadow is cast. In FIGURE 7A, as an example the source is shown displaced from the tracking axis by the angle $\beta_{ERROR}$. Under such conditions, the counts developed in the $N_1$ channel are as indicated at point 70, and the counts in the $N_2$ channel are as indicated at point 72. The difference between the two is related to the angle, $\beta_{ERROR}$, the angle by which the source deviates from the tracking plane. For the idealized curves of FIGURE 7A, the relationship is linear. Under actual conditions, the relationship can be made substantially linear in certain ranges; however, it is not essential.

Although the curves of FIGURES 7A and 7B are idealized, the apparatus may be arranged so that the response curve shown are not far from the actual case. The preferred radiation sources emit gamma rays or bremsstrahlung. Such radiation is continuous but is statistical. Further, radiation emitted from the source and reaching the detectors does not travel in a straight line. This radiation cannot be readily focused in the manner of light. It is emitted from the source in all directions and upon interacting with matter may result in scattered radiation, some of which may reach the detectors, albeit at a lesser energy than the radiation from the source. If a source of gamma rays were to be located in the direction 66, the gamma radiation arriving at the detectors would be from all directions with a maximum from the direction of the source. Because of this scattering, the actual curves will not break as sharply as shown in FIGURE 7A and will not reach their maxima when the radioactive material lies in the tracking plane. Further, there is frequently a considerable radiation background from other sources including cosmic rays and there may be an appreciable scattering from the ground which is particularly troublesome at low angles of elevation.

Fortunately, this can be largely eliminated by appropriate adjustment of the discriminators 42 and 44. As was noted above, discriminators conventionally eliminate low energy pulses. If the discrimination level is set relatively high the effect of much of the background radiation and the scattered gamma radiation can be eliminated. This is because only the gamma rays passing directly from the source to the detector will have the full energy they started with. It is preferred to use radio-active material that emits substantially monoenergetic gamma radiation or at least mostly gamma rays having relatively high energies within a relatively small range. Cobalt 60 is a satisfactory source. When these gamma rays are scattered, the resultant gamma radiation necessarily has lower energies, and gamma rays will reach the detectors from the direction of the source having all energies from the energy of the source gamma rays on down. Hence in the preferred form of the invention the discrimination level is set to pass substantially only those pulses representative of energies of gamma rays emitted by the source. It makes the response curves more nearly like the idealized curves shown in FIGURE 7A and makes it easier to determine the difference in counting rates.

It may be noted from FIGURE 7A that the direction of the source can be more accurately located by making the slope of the response curves steeper. This can be done by increasing source strength and detector sensitivity, but there are practical limits to the size of source and detector that can be used. The slope may also be made steeper by making the detectors elongated parallel to the side of 38 but normal to the tracking plane. Still another way of increasing the slope is to elongate the shield 38 in the direction of the source.

The accuracy of the tracking unit can be improved by using the shield shown in FIGURE 4. As shown in FIGURES 6B and 7B, the shield of FIGURE 4 casts a shadow on detector 34 until the source is some distance from the tracking plane. This shield effectively shifts the respective response curves, as shown in FIGURE 7B, so that both $N_1$ and $N_2$ are somewhere between their midpoint values and the background count 79. Now a given change in $\beta_{ERROR}$ will produce twice the difference in $N_1 - N_2$, which counting rates are shown at points 76 and 78 on response curves $N_1$ and $N_2$. Since both $N_1$ and $N_2$ are themselves reduced from the values indicated in FIGURE 3, a further increase in accuracy around $\beta_{ERROR} = 0$ arises because the uncertainty or standard deviation of the count difference $N_1 - N_2$, being given by $\sqrt{N_1 + N_2}$, is less for the shield arrangement of FIGURE 4. This uncertainty will vary throughout the range of $\beta$ since the sum $N_1 + N_2$ will not remain constant. This does not restrict the used $N_1 - N_2$ as a servo control signal because only the uncertainty, and not the polarity, of $N_1-N_2$ is altered.

Geometrical principles hold that three coordinates define a position in space. These coordinates may be the identification of three planes containing the point, as three intersecting planes intersect in but a single point so long as all three are not collinear. In the preferred form of this invention, each pair of detectors is positioned by a servo system so that the tracking plane 10 points at the source on the missile. Although three separate tracking units could be used to identify each of three tracking planes, in the preferred form of the invention, shown in FIGURE 2, each tracking unit is comprised of two orthogonal pairs of detectors and therefore supplies sufficient information to identify two tracking planes with each unit.

In practice, the direction of the tracking unit involves controlled motion in two planes. The tracking unit is moved in elevation by motor 24 and in azimuth by motor 32. The azimuth plane is vertical and is the tracking plane 40 of the tracking unit 14A. The elevation plane is orthogonal thereto and is the tracking plane of the tracking unit 14B.

The counting rate meters and the subtractor determine whether more radiation is being detected by one or the other of the detectors of a pair. In the case of the pair of azimuth detectors, the output of the subtractor 50 drives the servo motor 32 to turn the detection unit azimuthally toward the point where equal radiation signals are derived from the respective sides of the azimuth tracking plane; at this point the counting rate meters 46 and 48 would develop equal signals and provide a balanced input to the subtractor 50, which then would produce no output, and the azimuth motor 32 would stop. At this point, the source on the missile lies in the azimuth tracking plane, and the output of the azimuth angle transmitter 54 corresponds to an azimuth angle $\beta$ defining one of the three planes required to define the position of the missile. Similarly, the output of the elevation angle transmitter corresponds to an elevational angle $\alpha$ defining a second of the three planes.

The third plane is determined by the tracking unit 16. Inasmuch as each tracking unit has information defining two planes, a fourth plane can as well be identified with the tracking unit 16. All of this information is then preferably converted to a coordinate system in which all of the coordinates relate to a fixed datum.

The signals corresponding to the azimuth angles $\beta_1$ and $\beta_2$ as determined by respective tracking units 14 and 16 and the signals corresponding to the elevation angles $\alpha_1$ and $\alpha_2$ as determined by respective tracking units 14 and 16 may be applied to the same sort of computer as utilized in prior optical tracking systems. A block diagram of such a computer is shown in FIGURE 8, where the signals are applied to a position computer 80 which computes the position of the source relative to some reference datum preferably the launching pad of the missile. The position is indicated in three dimensional coordinates, preferably Cartesian coordinates in which $x$ and $y$ are the horizontal coordinates and $z$ the vertical coordinate, or in space-polar coordinates in which $\theta$ is the azimuth, $\phi$ is the elevation and $r$ is the range. These indications may be recorded on a recorder 82. Further, the computer may include a velocity computer 84 which comprises differentiating circuits to compute $dr/dt$, $d\theta/dt$ and $d\phi/dt$. The computer may also include an acceleration computer 86 which comprises differentiating circuits to compute $d^2r/dt^2$, $d^2\theta/dt^2$ and $d^2\phi/dt^2$.

While preferred embodiments of the invention have been shown and described, various modifications thereof are within the scope of the invention, which is limited only by the claims. For example, although a visual read-out is shown and described, the read-out indication may be in the form of signals used to control the flight of the missile or to project its flight path to determine where it is going.

Further, the shield arrangement shown in FIGURES 3 and 4 is effective when used with other types of radiation detectors, such as ionization chambers, in which case the output signals are themselves direct currents which can be directly compared in the comparison circuit 50 without the need for discriminators or counting rate meters. It is also within the scope of this invention to make allowance or corrections for errors as may be occasioned by inherent delays in measurement and tracking.

Although the invention has been described as applicable to a missile leaving its pad, the invention also applies to the tracking of a missile approaching from an unknown direction in space. The invention has particular utility for tracking such missiles because of its great field of "vision." That is, each of the detectors 34 and 36 can "see" over a dihedral angle of about 90°. Should a greater field of vision be desirable part or all of the shield 56 can be dispensed with. It may sometimes be desirable to space units 14b so that one does not shield the other in any way. The large field of vision means that wherever the missile comes from, it will be in the field of vision of one or the other of the detectors and the tracking unit will turn appropriately to place the missile in the tracking plane. The large field of vision also makes it impossible for the tracking unit to lose track of the missile.

What is claimed is:
1. Apparatus for tracking a body moving in space and carrying radioactive material that effectively produces a single source of penetrating radiation, said apparatus comprising a radiation shield effective to stop a substantial portion of said penetrating radiation striking it, a pair of detection means each responsive to said single source of penetrating radiation by producing detection signals systematically related to the radiation detected, said detection means being disposed on respective opposite sides of said radiation shield, comparison means for comparing detection signals from the respective detection means, means responsive to said comparison means for positioning said radiation shield to make the compared signals more nearly equal, and means responsive to the position of said radiation shield for deriving a signal indicative of the direction of said radioactive material relative to said radiation shield.

2. Apparatus for tracking a body moving in space and carrying radioactive material that effectively produces a single source of penetrating radiation, said apparatus comprising a pair of detectors each responsive to said single source of penetrating radiation by producing detection signals systematically related to the radiation detected, a radiation shield effective to stop a substantial portion of said penetrating radiation striking it, said radiation shield being disposed between said radiation detectors and extending transversely therefrom a substantial distance, comparison means for comparing detection signals from the respective detectors by deriving a comparison signal indicative of their relative magnitude, means responsive to said comparison signal for directing said radiation shield and said detectors as a unit to make the compared signals more nearly equal, and means responsive to the direction of said radiation shield for deriving a signal indicative of the direction of said radioactive material relative to said radiation shield.

3. Apparatus for tracking a body moving in space and carrying radioactive material that effectively produces a single source of penetrating radiation, said apparatus comprising a pair of detectors each responsive to said single source of penetrating radiation by producing detection signals systematically related to the radiation detected, a radiation shield disposed between said radiation detectors to define a tracking plane and serving to stop a substantial portion of said penetrating radiation when directed at one of said detectors from the other side of said tracking plane, comparison means for comparing detection signals from the respective detectors by deriving a comparison signal indicative of their relative magnitude, means responsive to said comparison signal for directing said radiation shield and the tracking plane thereby defined to make the compared signals more nearly equal, and means responsive to the direction of said radiation shield for deriving a signal indicative of the direction of said radioactive material relative to said radiation shield.

4. Apparatus for tracking a body moving in space and carrying radioactive material that effectively produces a single source of penetrating radiation, said apparatus comprising a pair of detectors each responsible to said single source of penetrating radiation by producing detection signals systematically related to the radiation detected, a radiation shield disposed between said radiation detectors to define a tracking plane and serving to stop a substantial portion of said penetrating radiation when directed at one of said detectors from the other side of said tracking plane, radiation from the other side of said tracking plane reaching the other of said detectors relatively unimpeded over a substantial dihedral angle, comparison means for comparing detection signals from the respective detectors by deriving a comparison signal indicative of their relative magnitude, means responsive to said comparison signal for directing said radiation shield and the tracking plane thereby defined to make the compared signals more nearly equal, and means responsive to the direction of said radiation shield for deriving a signal indicative of the direction of said radioactive material relatve to said radiation shield.

5. Apparatus for tracking a body moving in space carrying radioactive material that effectively produces a single source of penetrating radiation, said apparatus comprising a pair of detectors each responsive to said single source of penetrating radiation by producing detection signals systematically related to the radiation detected, shadow casting means disposed before said detectors and defining a tracking plane between said detectors, said shadow casting means being effective to stop a substantial portion of said penetrating radiation striking it and casting more shadow on the one of said detectors lying on the side of said tracking plane opposite said radioactive material than on the other of said detectors, comparison means for comparing detection signals from the respective detectors by deriving a comparison signal indicative of their relative magnitude, means responsive to said comparison signal for directing said shadow casting means and the tracking plane thereby defined to make the compared signals more nearly equal, and means responsive to the direction of said shadow casting means for deriving a signal indicative of the direction of said radioactive material relative to said shadow casting means.

6. Apparatus for tracking a body moving in space and carrying radioactive material that produces penetrating radiation, said apparatus comprising a pair of detectors each responsive to said penetrating radiation by producing detection pulses systematically related to the radiation detected, a radiation shield disposed between said radiation detectors to define a tracking plane and serving to stop a substantial portion of said penetrating radiation when directed at one of said detectors from the other side of said tracking plane, radiation from the other side of said tracking plane reaching the other of said detectors relatively unimpeded, discrimination means for stopping all such pulses smaller than a predetermined size, a pair of counting rate meters each responsive to the pulses from a respective detector not stopped by said discrimination means for deriving a respective D.C. signal indicative of the number of said pulses per unit time, comparison means for comparing the respective D.C. signals by deriving a comparison signal indicative of their relative magnitude, means responsive to said comparison signal for directing said radiation shield and the tracking plane thereby defined to make the compared signals more nearly equal, and means responsive to the direction of said radiation shield for deriving a signal indicative of the direction of said radioactive material relative to said radiation shield.

7. Apparatus for tracking a body moving in space and carrying radioactive material that produces penetrating radiation, said apparatus comprising a pair of directionally sensitive radiation detectors responsive to said penetrating radiation incident thereon from respective substantially mutually exclusive directions by producing respective detection pulses systematically related to the radiation detected, discrimination means for stopping all such pulses smaller than a predetermined size, a pair of counting rate meters each responsive to the pulses from a respective detector not stopped by said discrimination means for deriving a respective D.C. signal indicative of the number of said pulses per unit time, comparison means for comparing said respective D.C. signals by deriving a comparison signal indicative of their relative magnitude, means responsive to said comparison signal for directing said two detectors as a unit to make the compared signals more nearly equal, and means responsive to the direction of said detectors for deriving a signal indicative of the direction of said radioactive material relative to said detectors.

8. Apparatus for tracking a body moving in space and carrying radioactive material that produces penetrating radiation, said apparatus comprising a pair of directionally sensitive radiation detectors responsive to said penetrating radiation incident thereon from respective substantially mutually exclusive directions by producing respective detection pulses systematically related to the radiation detected, two discrimination means each associated with a respective one of said detectors for stopping all such pulses smaller than a predetermined size, two pulse shapping means each associated with a respective one of said discrimination means for converting the pulses passed by said discrimination means into respective shaped pulses of uniform size and shape, the pulses from each of the respective pulse shaping means being of opposite polarity from those of the other, means responsive to said shaped pulses of both polarities for deriving a derived signal indicative to the difference in counting rates of the pulses of respective polarities, means responsive to said derived signal for directing said two detectors as a unit to reduce the difference in said counting rates, and means responsive to the direction of said detectors for deriving a signal indicative of the direction of said radioactive material relative to said detectors.

9. Apparatus for tracking a body moving in space and carrying radioactive material that effectively produces a single source of penetrating radiation, said apparatus comprising a pair of directionally sensitive radiation detectors responsive to said single source of penetrating radiation incident thereon from respective substantially mutually exclusive directions by producing respective D.C. detection signals systematically related to the radiation detected, comparison means for comparing said respective D.C. signals by deriving a comparison signal indicative of their relative magnitude, means responsive to said comparison signal for directing said two detectors as a unit to make the compared signals more nearly equal, and means responsive to the direction of said detectors for deriving a signal indicative of the direction of said radioactive material relative to said detectors.

References Cited by the Examiner

UNITED STATES PATENTS

| | | | |
|---|---|---|---|
| 2,836,726 | 5/1958 | Rich | 250—83.6 |
| 2,930,545 | 3/1960 | Houle et al. | 244—14 |
| 3,047,721 | 7/1962 | Folsom et al. | 250—71.5 |
| 3,091,463 | 5/1963 | Cohen et al. | 250—71.5 X |
| 3,098,944 | 7/1963 | Fox | 250—105 X |

References Cited by the Applicant

Applied X-Rays by George L. Clark, 3rd edition, McGraw-Hill Book Company, Inc, New York, 1948, pp. 139–141.

RALPH G. NILSON, *Primary Examiner.*

ARCHIE R. BORCHELT, *Examiner.*